UNITED STATES PATENT OFFICE.

OSCAR BALLY, OF MANNHEIM, GERMANY, ASSIGNOR TO THE BADISCHE-ANILIN AND SODA FABRIK, OF LUDWIGSHAFEN, GERMANY.

GREEN DYE.

SPECIFICATION forming part of Letters Patent No. 640,986, dated January 9, 1900.

Application filed October 17, 1899. Serial No. 733,917. (No specimens.)

*To all whom it may concern:*

Be it known that I, OSCAR BALLY, doctor of philosophy, a citizen of the Swiss Republic, residing at Mannheim, in the Grand Duchy of Baden and Empire of Germany, have invented new and useful Improvements in the Manufacture of Green Dye, (for which applications for patents have been filed in Germany, Nos. B. 24,517 and 24,518, both of April 1, 1899, and in France, Depot No. 280,790, of September 21, 1899,) of which the following is a specification.

I have invented a new coloring-matter of the anthracene series which dies unmordanted wool fast-green shades. The initial material for this coloring-matter is chlor-substituted diamido-anthraquinone, such as can be obtained by treating diamido-anthraquinone with chlorin (either pure 1.5-diamido-anthraquinone or a crude diamido-anthraquinone, such as can be obtained by reducing the crude nitration product of anthraquinone) at the ordinary temperature or at a temperature but slightly higher than the ordinary temperature in the presence of a diluent, such as glacial acetic acid. This chlor-diamido-anthraquinone has been found to yield valuable coloring-matter if it be condensed with an aromatic amin and the so-resulting condensation product be subsequently sulfonated.

In the following I will describe the manner in which my invention can best be carried into effect. The parts are by weight.

*Example 1. Production of chlor-1.5-diamido-anthraquinone.*—Ten (10) parts of 1.5-diamido-anthraquinone are suspended in two hundred (200) parts of glacial acetic acid, and chlorin is passed into this at the ordinary temperature or a temperature but slightly above the ordinary until the evolution of hydrochloric acid has moderated. Two reaction products will then have been formed—one in solution and the other in suspension. This latter is the chlor-diamido-anthraquinone, which I use as initial material for my present invention. The product in suspension, which is a brick-red powder, is now filtered off. It is insoluble in cold water, but soluble in glacial acetic acid, alcohol, nitrobenzene, and in benzene, giving solutions varying in color from yellowish brown to reddish brown. By crystallization from alcohol and nitro-benzene a product can be obtained from it which crystallizes in fine brown needles, possessing the solubilities hereinbefore enumerated and which does not melt even at 300° centigrade and whose chlorin content corresponds with that of tetra-chlor-diamido-anthraquinone.

*Example 2. Production of condensation product of chlor-1.5-diamido-anthraquinone and para-toluidin.*—Mix ten (10) parts of the chlor-diamido-anthraquinone obtained as directed in the preceding example with one hundred (100) parts of para-toluidin and heat up to the boiling-point of the latter and maintain at this temperature until the color of the melt no longer changes. The originally-red melt becomes finally blue green. Cool and extract with alcohol. The undissolved residue consists of the coloring-matter in indigo-like crystals. It is difficultly soluble in alcohol, but is more easily soluble in benzene and in anilin, giving a blue color. Its solution in notro-benzene is green blue. With concentrated sulfuric acid of 66° Baumé it gives an olive-green color, which on heating to 100° turns violet, and if boric acid be now added the color becomes green. In this example the para-toluidin may be substituted by para-toluidin-hydrochlorate, and a diluent, such as naphthalene, may also be employed without materially affecting the results.

*Example 3. Production of a water-soluble sulfo-acid from the product of Example 2.*—Stir ten (10) parts of the product obtained according to Example 2 into one hundred (100) parts of monohydrate sulfuric acid at the ordinary temperature. Now heat gradually to 50° centrigrade, and keep at this temperature until a test portion is completely soluble in hot water. The new dyestuff can be isolated by pouring this melt into cold water and salting out the sulfo-acid.

The so-obtained coloring-matter in the dry state is a green-gray powder, easily soluble in water with a green-blue color, which water solution is scarcely affected by the addition of caustic soda. Sulfuric acid of 66° Baumé gives a violet color. It dyes unmordanted wool very bright fast-green shades.

Instead of para-toluidin in the above example I can also use other aromatic amins, such as ortho-toluidin, anilin, &c. The products then resulting can also be sulfonated according to the method given in Example 3.

The coloring-matter obtained when using chlor-substituted diamido-anthraquinone obtained according to the method of Example 1, using, however, the crude diamido-anthraquinone, as above defined, in place of the 1.5-diamido-anthraquinone, and subsequent treatment with an aromatic amin and subsequent sulfonation does not differ, essentially, from the products obtained according to Examples 1, 2, and 3.

I claim—

1. As a new article of manufacture the green coloring-matter which can be obtained from chlor-substituted diamido-anthraquinone, as hereinbefore defined, and an aromatic amin, which in the unsulfonated state is insoluble in cold water, and with cold concentrated sulfuric acid gives an olive-green color, which on heating to 100° becomes violet and which violet becomes green if boric acid be added to it; in the sulfonated state it is soluble in water giving a green-blue solution whose color is hardly affected by caustic soda and gives with sulfuric acid of 66° Baumé a violet color, all substantially as hereinbefore described.

2. As a new article of manufacture the green coloring-matter which can be obtained from chlor-1.5-diamido-anthraquinone, as hereinbefore described, and para-toluidin, and which in the unsulfonated state is insoluble in cold water and with cold concentrated sulfuric acid gives an olive-green color, which on heating to 100° becomes violet and which violet becomes green if boric acid be added to it; in the sulfonated state it is soluble in water giving a green-blue solution whose color is hardly affected by caustic soda, and gives with sulfuric acid of 66° Baumé a violet color, all substantially as hereinbefore described.

In testimony whereof I have hereunto set my hand in the presence of two subscribing witnesses.

OSCAR BALLY.

Witnesses:
ERNEST F. EHRHARDT,
BERNHARD C. HESSE.